(12) United States Patent
Manaka et al.

(10) Patent No.: US 7,047,993 B2
(45) Date of Patent: May 23, 2006

(54) PILOT SWITCHING VALVE APPARATUS AND A METHOD OF SWITCHING PILOT SWITCHING VALVE

(75) Inventors: Nobuyuki Manaka, Ibaraki (JP); Koji Matsuda, Ibaraki (JP)

(73) Assignee: SMC Corporation, Tokyo (JP)

( * ) Notice: Subject to any disclaimer, the term of this patent is extended or adjusted under 35 U.S.C. 154(b) by 1 day.

(21) Appl. No.: 10/809,081

(22) Filed: Mar. 25, 2004

(65) Prior Publication Data

US 2004/0187940 A1     Sep. 30, 2004

(30) Foreign Application Priority Data

Mar. 28, 2003   (JP)   ............................. 2003-092054

(51) Int. Cl.
*F15B 13/042*     (2006.01)
(52) U.S. Cl. .................... 137/14; 137/625.66; 137/907
(58) Field of Classification Search ................. 137/14, 137/625.66, 907
See application file for complete search history.

(56) References Cited

U.S. PATENT DOCUMENTS 4,416,307 A * 11/1983 Detweiler .............. 137/625.66

FOREIGN PATENT DOCUMENTS

JP         63-106966        5/1988

* cited by examiner

*Primary Examiner*—John Rivell
(74) *Attorney, Agent, or Firm*—Hisako Muramatsu, Esq.

(57) ABSTRACT

In a valve chest of the pilot switching valve, a positive pressure chamber and a negative pressure chamber are formed on opposite sides of a valve spindle making a reciprocating motion in the valve chest due to repulsion by a return spring, and by connecting a positive pressure source for feeding a positive pilot pressure to the positive pressure chamber, and a negative pressure source for feeding a negative pilot pressure to the negative pressure chamber, the pilot switching valve has the configuration such that displacement of the valve spindle takes place against the urging of the return spring and connection among respective ports in the pilot switching valve can be switched only when pilot pressures from the positive pressure source and the negative pressure source are fed into the positive pressure chamber, and the negative pressure chamber, respectively where a malfunction of a switching valve is prevented.

4 Claims, 1 Drawing Sheet

PILOT SWITCHING VALVE APPARATUS AND A METHOD OF SWITCHING PILOT SWITCHING VALVE

BACKGROUND OF THE INVENTION

The invention relates to a pilot switching valve apparatus for causing a valve spindle inserted in a valve chest having a plurality of ports, so as to be reciprocatively movable, to be displaced by feeding pilot pressures from pressure sources into the valve chest, respectively, to thereby effect switching of connection among the respective ports, and a method of switching a pilot switching valve.

With reference to a switching valve in which a valve spindle having a valve element provided around the periphery thereof is inserted in a valve chest inside a valve block so as to be reciprocatively movable, being repulsed in a return direction by an urging force of a return spring, and switching of connection among a plurality of ports communicating with the valve chest is effected by causing the valve spindle to undergo displacement against the urging force of the return spring, various types including one disclosed in Patent Document 1 are well known.

Among those types of switching valves, there is generally well known a switching valve in which, for effecting switching of connection among respective ports, a valve spindle is caused to undergo displacement against an urging force of a return spring by feeding a pilot pressure from positive pressure sources into a valve chest so as to act on the valve spindle. With such a pilot switching valve apparatus as above, however, if the pilot pressure is unintentionally fed into the valve chest by error due to malfunction of the positive pressure sources, and so forth, this will cause the switching valve as well to undergo malfunction, thereby executing switching of connection among the respective ports. Accordingly, in order to prevent such malfunction of the switching valve, there is the need for providing the switching valve apparatus with a particular safety circuit, in which case the configuration of the switching valve apparatus will become complex, posing a problem that a higher cost results.

[Patent Document 1]

Japanese Unexamined Patent Publication No. Sho 63 (1988)-106966

SUMMARY OF THE INVENTION

The technical problem of the present invention is to resolve the problem described, and it is an object of the present invention to provide a pilot switching valve apparatus capable of preventing malfunction of a switching valve, due to unintentional feeding of pilot pressures into a valve chest by error, at a low cost with the adoption of a simple configuration, and a method of switching the pilot switching valve.

To that end, as one aspect of the invention, a pilot switching valve apparatus comprises a pilot switching valve comprising:

a valve block having a plurality of ports, and a valve chest communicating with a first pilot flow path, and a second pilot flow path;

a valve spindle having a valve element provided around the periphery thereof, for switching connection among the plurality of the ports, inserted in the valve chest so as to be reciprocatively movable between two switching positions;

a return spring for repulsing the valve spindle toward one of the switching positions by a urging force thereof, wherein a first pressure receiving face with an area S1 is provided at one end of the valve spindle, on the side of one of the switching positions, the first pressure receiving face together with an inner sidewall of the valve chest forming a first pressure chamber communicating with the first pilot flow path while a second pressure receiving face with an area S2 is provided at the other end of the valve spindle on the side of the other of the switching positions, the second pressure receiving face together with the inner sidewall of the valve chest forming a second pressure chamber communicating with the second pilot flow path;

a positive pressure source connected to the first pilot flow path, for feeding a positive pilot pressure P1 into the first pressure chamber; and a negative pressure source connected to the second pilot flow path, for feeding a negative pilot pressure −P1 into the second pressure chamber, wherein a relationship exists such that $S1 \cdot P1 \leq F1$, $S2 \cdot P2 \leq F1$, and $S1 \cdot P1 + S2 \cdot P2 > F2$ provided that an urging force of the return spring is F1 when the valve spindle is at the one of the switching positions, and an urging force of the return spring is F2 when the valve spindle is at the other of the switching positions, so that only when the positive pilot pressure P1 and the negative pilot pressure −P2 are concurrently fed from the positive pressure source and the negative pressure source into the positive pressure chamber, and the negative pressure chamber, respectively, displacement of the valve spindle from the switching position on the side of the positive pressure chamber to the switching position on the side of the negative pressure chamber takes place, thereby effecting switching of connection among the plurality of ports.

With the pilot switching valve apparatus, a pair of valve seats are preferably formed in the valve chest so as to oppose each other, the valve spindle is preferably inserted in the valve chest such that the valve element is positioned between the pair of the valve seats, and the valve element is caused to come into contact, or out of contact with the respective valve seats by reciprocatively moving the valve spindle in the valve chest, thereby switching connection among the respective ports.

More specifically, the plurality of the ports may comprise a first port, a second port, and an output port, the valve spindle may have a pair of constrictions, for forming a flow path inside the valve chest, respectively, on opposite sides of the valve element thereof, and a pair of seal parts provided around the periphery thereof, so as to be slidable on the inner sidewall of the valve chest with the constrictions interposed therebetween, respective outer end faces of the pair of the seal parts together with respective end faces of the valve spindle may form the first pressure receiving face and the second pressure receiving face, respectively, respective diameters of portions of the inner sidewall of the valve chest, where the respective seal parts of the valve spindle slide, may be all substantially equal to respective diameters of portions of the inner sidewall of the valve chest, forming the respective valve seats, and the first port and the second port may communicate with respective parts of the valve chest, at positions where the flow path is formed by the pair of the constrictions, respectively, while the output port may communicate with a part of the valve chest, positioned between the pair of the valve seats, and the valve element maybe brought into contact with, or out of contact with the respective valve seats by causing the valve spindle to move reciprocatively in the valve chest to thereby switch connection between the first port as well as the second port and the output port.

In another aspect of the invention, a method of switching a pilot switching valve comprises:

a valve block having a plurality of ports, and a valve chest communicating with a first pilot flow path, and a second pilot flow path;

a valve spindle having a valve element provided around the periphery thereof, for switching connection among the plurality of the ports, inserted in the valve chest so as to be reciprocatively movable between two switching positions; and a return spring for repulsing the valve spindle toward one of the switching positions by a urging force thereof, wherein a first pressure receiving face with an area S1 is provided at one end of the valve spindle, on the side of one of the switching positions, the first pressure receiving face together with an inner sidewall of the valve chest forming a first pressure chamber communicating with the first pilot flow path while a second pressure receiving face with an area S2 is provided at the other end of the valve spindle on the side of the other of the switching positions, the second pressure receiving face together with the inner sidewall of the valve chest forming a second pressure chamber communicating with the second pilot flow path, said method comprising the steps of;

concurrently feeding a positive pilot pressure P1 and a negative pilot pressure −P2, satisfying a relationship such that $S1 \cdot P1 \leq F1$, $S2 \cdot P2 \leq F1$, and $S1 \cdot P1 + S2 \cdot P2 > F2$ provided that an urging force of the return spring is F1 when the valve spindle is at the one of the switching positions, and an urging force of the return spring is F2 when the valve spindle is at the other of the switching positions, into the positive pressure chamber, and the negative pressure chamber, via the first pilot flow path and the second pilot flow path, respectively; and causing displacement of the valve spindle from the switching position on the side of the positive pressure chamber to the switching position on the side of the negative pressure chamber to take place, thereby effecting switching of connection of the plurality of ports.

Thus, with the pilot switching valve apparatus, and the method of switching the pilot switching valve, according to the invention, only when the positive pilot pressure P1 and the negative pilot pressure −P2 are concurrently fed to the first pressure chamber, and the second pressure chamber, formed on the opposite sides of the valve spindle in the valve chest, respectively, displacement of the valve spindle, from the first pressure chamber side to the second pressure chamber side, takes place, thereby switching connection of the respective ports, so that even if the pilot pressure is unintentionally fed into either the first pressure chamber or the second pressure chamber by error, displacement of the valve spindle does not take place, thereby preventing switching of connection from occurring among the respective ports. Hence, malfunction of the switching valve can be prevented at a low cost without the need for a particular circuit.

DETAILED DESCRIPTION OF THE PREFERRED EMBODIMENTS

Figure 1:
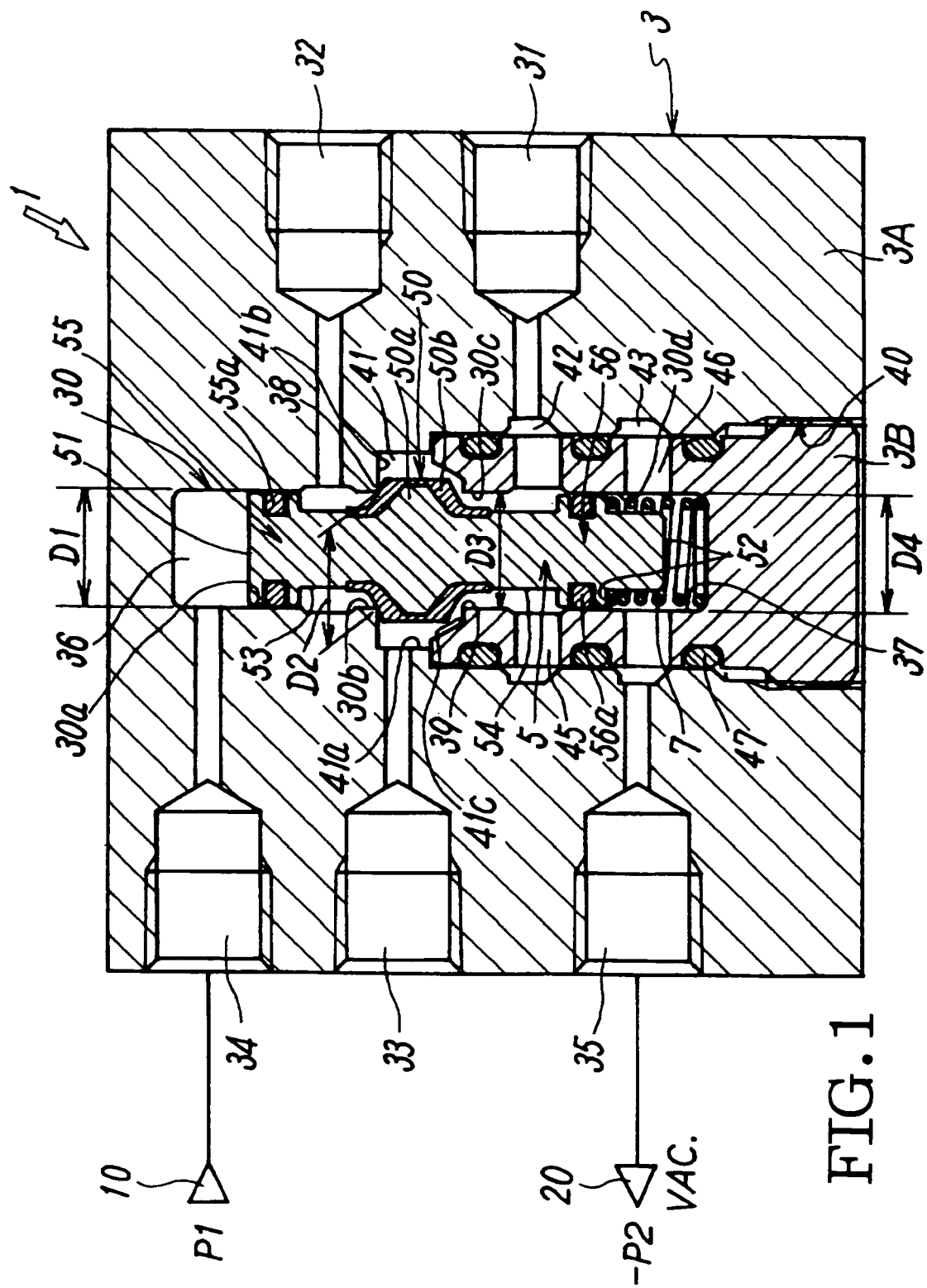
FIG. 1 is a sectional view of a pilot switching valve 1 showing one embodiment of the invention.

FIG. 1 shows one embodiment of the invention, and a pilot switching valve 1 comprises a plurality of ports 31 to 33, a valve block 3 incorporating a valve chest 30 communicating with a first pilot flow path 34, and a second pilot flow path 35, a valve spindle 5 having a valve element 50 provided around the periphery thereof, for switching connection among the ports 31 to 33, inserted in the valve chest 30 so as to be reciprocatively and slidably movable between two switching positions, and a return spring 7 for repulsing the valve spindle 5 toward one of the switching positions (the switching position shown in FIG. 1) by a urging force thereof.

A first pressure receiving face 51 with an area S1 is provided at one end of the valve spindle 5, on the side of the one of the switching positions, and the first pressure receiving face 51 together with an inner sidewall of the valve chest 30, at one end thereof, form a first pressure chamber 36 communicating with the first pilot flow path 34 while a second pressure receiving face 52 with an area S2 is provided at the other end of the valve spindle 5 on the side of the other of the switching positions, and the second pressure receiving face 52 together with an inner sidewall of the valve chest 30, at the other end thereof, form a second pressure chamber 37 communicating with the second pilot flow path 35.

The pilot switching valve apparatus comprises the pilot switching valve 1, a positive pressure source 10 connected to the first pilot flow path 34, for feeding a positive pilot pressure P1 into the first pressure chamber 36, and a negative pressure source 20 connected to the second pilot flow path 35, for feeding a negative pilot pressure −P2 into the second pressure chamber 37. That is, with the pilot switching valve apparatus, the first pressure chamber 36 serves as a positive pressure chamber connected to the positive pressure source 10 via the first pilot flow path 34, and the second pressure chamber 37 serves as a negative pressure chamber connected to the negative pressure source 20 via the second pilot flow path 35 (hereinafter "the first pressure chamber 36" is referred to as "a positive pressure chamber 36", and "the second pressure chamber 37" is referred to as "a negative pressure chamber 37").

Now, with the pilot switching valve 1, assuming that an urging force of the return spring 7 is F1 when the valve spindle 5 is at the one of the switching positions, and an urging force of the return spring 7 is F2 when the valve spindle 5 is at the other of the switching positions, there exists a relationship as follow:

$S1 \cdot P1 \leq F1$, $S2 \cdot P2 \leq F1$, and $S1 \cdot P1 + S2 \cdot P2 > F2$.

Accordingly, only when the positive pilot pressure P1 and the negative pilot pressure −P2 are fed into the positive pressure chamber 36, and the negative pressure chamber 37, via the respective pilot flow paths 34, 35, respectively, displacement of the valve spindle 5, from the switching position on the side of the positive pressure chamber 36 to the switching position on the side of the negative pressure chamber 37, takes place, thereby switching connection among the plurality of ports 31 to 33.

Hence, in the case where the valve spindle 5 is at the switching position on the side of the positive pressure chamber 36 as shown in FIG. 1, even if the pilot pressure is unintentionally fed into either the positive pressure chamber 36 or the negative pressure chamber 37, connection among the respective ports 31 to 33 is not switched, so that prevention of malfunction of the pilot switching valve 1 can be implemented at a low cost with the adoption of a simple configuration, and without the need for a particular circuit.

Inside the valve chest 30, a pair of a first valve seat 38 and a second valve seat 39, opposing each other, are formed by a first valve seat face 30b and a second valve seat face 30c, each being a portion of the inner sidewall of the valve chest 30, and the valve spindle 5 is inserted in the valve chest 30 such that the valve element 50 is located between the valve seats 38, 39. By causing the valve spindle 5 to reciprocatively slide inside the valve chest 30, opposite side surfaces of the valve element 50 are caused to come into contact, or out of contact with the valve seats 38, 39, respectively, thereby switching connection among the respective ports 31 to 33. More specifically, the valve element 50 has sidewall faces formed in the shape of a slant surface, slanting toward respective ends of the valve spindle 5, respectively, and is formed so as to have a diameter larger than that of a part of the valve chest 30, at each of the valve seats 38, 39. Thus, a poppet valve is formed with the valve spindle 5 having the valve element 50 provided around the periphery thereof and the pair of the valve seats 38, 39.

The plurality of the ports 31 to 33 include a first port 31 and a second port 32, serving as an input port or an exhaust port, and a third port 33 serving as an output port (hereinafter referred to as an output port 33). On opposite sides of the valve element 50 of the valve spindle 5, a first constriction 53 and a second constriction 54, for forming a flow path inside the valve chest 30, respectively, and a first seal part 55, and a second seal part 56, in protruded shape, airtightly slidable on a first slide face 30a and a second slide face 30d, formed of a portion of the inner sidewall of the valve chest 30, respectively, are provided around the periphery of the valve spindle 5 with a pair of the first constriction 53 and the second constriction 54, interposed between the first seal part 55, and the second seal part 56. Further, the first pressure receiving face 51 with the area S1 and the second pressure receiving face 52 with the area S2 are formed by respective outer side faces of the first seal part 55 and the second seal part 56 (respective end faces thereof, facing the positive pressure chamber 36 and the negative pressure chamber 37) together with respective end faces of the valve spindle 5, respectively. Furthermore, the first port 31 and the second port 32 communicate with respective parts of the valve chest 30, where the respective constrictions 53, 54 form the flow path, and the output port 33 communicates with a part of the valve chest 30, between the pair of the valve seats 38, 39.

Further, respective diameters D1, D4 of portions of the inner sidewall of the valve chest 30, forming the first slide face 30a and the second slide face 30d, respectively, are all substantially equal to respective diameters D2, D3 of portions of the inner sidewall of the valve chest 30, forming the first valve seat face 30b and the second valve seat face 30c, respectively (D1=D2=D3=D4).

Accordingly, when respective pressures of fluids fed to the first port 31 and the second port 32, respectively, come to act on the respective constrictions 53, 54, interposed between the valve element 50 of the valve spindle 5 and the respective seal part 55. 56, forces acting in the axial direction of the valve spindle 5, caused by the respective pressures, are equal to, and balanced with each other, so that a force causing the valve spindle 5 to undergo displacement in the axial direction of the valve spindle 5 does not work, thereby enabling respective pressures applied to the fluids fed to the first port 31 and the second port 32, respectively, to be freely selected.

More specifically, the valve block 3 comprises a block body 3A in which a half of the valve chest 30, on the side of the positive pressure chamber 36, is formed, and a retainer 3B in which the other half of the valve chest 30, on the side of the negative pressure chamber 37, is formed.

The first port 31 and the second port 32 have respective openings disposed side by side along the valve chest 30, in one face of the block body 3A. While the output port 33 has an opening at a position corresponding to a halfway point between the first port 31 and the second port 32, in the other face of the block body 3A, opposite to the one face thereof, the first pilot flow path 34 and a second pilot flow path 35 have an opening disposed on opposite sides of the opening of the output port 33, along the valve chest 30, respectively.

In a face orthogonal to the faces of the block body 3A, having the respective openings of the ports 31 to 33, there is bored a retainer hole 40 in which the retainer 3B is screwed, and on the bottom face of the retainer 3B, on the retainer hole 40 side, there is inserted the other half of the valve chest 30, on the side of the negative pressure chamber 37. On the bottom face of the retainer 3B, on the retainer hole 40 side, the half of the valve chest 30, on the side of the positive pressure chamber 36, formed in the block body 3A and the other half of the valve chest 30, on the side of the negative pressure chamber 37, formed in the retainer 3B, are joined together with respective openings opposing each other, thereby forming the valve chest 30 in whole inside the valve block 3.

The first slide face 30a and the first valve seat face 30b are formed of the respective portions of the inner sidewall of the one half of the valve chest 30, inserted in a portion of the valve block 3, on the block body 3A side, and the one half of the valve chest 30, on the block body 3A side, is located between the first slide face 30a and the first valve seat face 30b, and communicates with the second port 32 through a part of the valve spindle 5, at a position where the flow path is formed by the first constriction 53.

Meanwhile, the second slide face 30d and the second valve seat face 30c are formed of the respective portions of the inner sidewall of the other half of the valve chest 30, inserted in another portion of the valve block 3, on the retainer 3B side, and the other half of the valve chest 30, on the retainer 3B side, is located between the second slide face 30d and the second valve seat face 30c, and communicates with the first port 31 through a part of the valve spindle 5, at a position where the flow path is formed by the second constriction 54.

Further, at the respective openings of portions of the valve chest 30, housed in the block body 3A and the retainer 3B, an output flow path groove 41 extending across the respective openings is provided around the periphery of the respective openings, and the output flow path groove 41 communicates with the output port 33. Sidewalls 41b, 41c of the output flow path groove 41 cross the first valve seat face 30b of the valve chest 30, on the block body 3A side, and the second valve seat face 30c of the valve chest 30, on the retainer 3B side, respectively, substantially at right angles, thereby forming the respective valve seats 38, 39.

As a result, the flow path formed in the valve chest 30 by the first constriction 53 communicates with, or is shut off from the output flow path groove 41 through the intermediary of the valve seat 38 on the positive pressure chamber 36 side while the flow path formed in the valve chest 30 by the second constriction 54 communicates with, or is shut off from the output flow path groove 41 through the intermediary of the valve seat 39 on the negative pressure chamber 37.

The output flow path groove 41 communicates with the output port 33 on the block body 3A side of a bottom wall 41a thereof.

A first flow path groove 42 communicating with the first port 31 and a second flow path groove 43 communicating with the second pilot flow path 35 are provided around the periphery of the sidewall of the retainer 3B inserted in the block body 3A. The respective flow path grooves 42, 43 communicate with a part of the valve chest 30, at the position where the flow path is formed by the second constriction 54, and with the negative pressure chamber 37, through a plurality of first flow path holes 45 and second flow path holes 46, provided along a circumferential direction of the retainer 3B so as to penetrate between the peripheral surface of the retainer 3B and the inner sidewall of the valve chest 30, respectively.

In this connection, the both sides of the first flow path groove 42 and the second flow path groove 43 are sealed by a plurality of sealing members 47, respectively. More specifically, by embedding the sealing member 47 made of an elastic material, such as rubber or the like, in grooves provided along the both sides of the respective flow path grooves 42, 43, and around the peripheral surface of the retainer 3B, the respective flow path grooves 42, 43, are sealed and at the same time, the valve chest 30 as well is sealed, thereby maintaining airtightness.

The valve spindle 5 is being repulsed toward the switching position on the side of the positive pressure chamber 36 by an urging force of the return spring (coil spring) 7 mounted, in a compressed state, between the outer end face of the second seal part 56, forming the second pressure receiving face 52, and the inner end face of the valve chest 30, opposed to the second pressure receiving face 52, thereby forming the negative pressure chamber 37. The return spring 7 has elasticity characteristics such that when the valve spindle 5 is at the switching position on the side of the positive pressure chamber 36, that is, in a state such that the valve element 50 is butted against the first valve seat 38, the valve spindle 5 is repulsed by the urging force F1 (provided S1·P1≦F1, S2·P2≦F1) of the return spring 7 while when the valve spindle 5 is at the switching position on the side of the negative pressure chamber 37, that is, in a state such that the valve element 50 is butted against the second valve seat 39, the valve spindle 5 is repulsed by the urging force F2 (provided S1·P1+S2·P2>F2) of the return spring 7.

Further, the respective seal parts 55, 56, of the valve spindle 5 are provided with a groove around the periphery thereof, and by virtue of a sealing member 47 made of an elastic material, embedded in the respective grooves, the positive pressure chamber 36 and the negative pressure chamber 37 are sealed, thereby maintaining airtightness.

The valve element 50 comprises a protruded part 50a, formed integrally with the valve spindle 5, substantially in the sectional shape of trapezoids, tapering down in width toward the respective tips thereof, and a valve member 50b made of an elastic material, such as rubber, and so forth, coated on the surface of the protruded part 50a, and a pair of slant surfaces of the valve element 50, coated with the valve member 50b, are butted against the first valve seat 38 and the second valve seat 39, respectively, thereby opening and closing the valve. Further, the first constriction 53 is formed between the inner end face of the first seal part 55 and one of the slant surfaces of the valve element 50, and the second constriction 54 is formed between the inner end face of the second seal part 56 and the other of the slant surfaces of the valve element 50.

The pilot switching valve apparatus as described above can be used for switching a pressure of a fluid to be fed to an adsorption pad in a vacuum adsorption unit for adsorbing and transferring a semiconductor chip in a semiconductor manufacturing device or a semiconductor testing device by, for example, connecting the first port 31 as an input port to a negative pressure source (not shown), and connecting the second port 32 as a de-vacuumizing port to open air or a positive pressure source (not shown) to thereby connect the output port 33 to the adsorption pad (not shown).

Now, operation of the pilot switching valve apparatus is described hereinafter.

First, in a state where feeding of a pilot pressure from the positive pressure source 10 and the negative pressure source 20 to the positive pressure chamber 36, and the negative pressure chamber 37, respectively, is stopped, one-side face of the valve element 50 provided around the periphery of the valve spindle 5 is butted against the first valve seat 38 on the side of the positive pressure chamber 36 by the urging force F1 of the return spring 7 while the-other-side face of the valve element 50 is out of contact with the second valve seat 39, on the side of the negative pressure chamber 37. Accordingly, the flow path formed by the first constriction 53 is shut off from the output flow path groove 41 to thereby cut off connection between the second port 32 and output port 33 while the flow path formed by the second constriction 54 comes to communicate with the output flow path groove 41 to thereby connect the first port 31 with the output port 33.

Further, in case that a pilot pressure such as the positive pilot pressure P1 or the negative pilot pressure −P2 is unintentionally fed into the positive pressure chamber 36 or the negative pressure chamber 37, respectively, by error due to malfunction and so forth of the positive pressure source 10 or the negative pressure source 20, the valve spindle 5 is not moved from the switching position on the side of the positive pressure chamber 36 because the urging force F1 of the return spring 7, toward the positive pressure chamber 36, acting on the valve spindle 5, is greater than a force (S1·P1 or S2·P2) of the pilot pressure, toward the negative pressure chamber 37, acting on the valve spindle 5. Thus, a state of the first port 31 being connected with the output port 33 as described above can be maintained.

Then, when the pilot pressures of the positive pilot pressure P1 and the negative pilot pressure −P2, respectively, are concurrently fed from the positive pressure source 10 and the negative pressure source 20 to the positive pressure chamber 36, and the negative pressure chamber 37, respectively, a force (S1·P1+S2·P2) of the pilot pressures, toward the negative pressure chamber 37, acting on the valve spindle 5, is greater than the urging force (F1 or F2) of the return spring 7 positioned at either of the switching positions described above, toward the positive pressure chamber 36, acting on the valve spindle 5, so that displacement of the valve spindle 5, from the positive pressure chamber 36 side to the negative pressure chamber 37 side, takes place against the urging force of the return spring 7. Accordingly, the-other-side face of the valve element 50 is butted against the valve seat 39 on the side of the negative pressure chamber 37 while the-one-side face of the valve element 50 is out of contact with the valve seat 38, on the side of the positive pressure chamber 38. As a result, the flow path formed by the second constriction 54 is shut off from the output flow path groove 41 to thereby cut off connection between the first port 31 and output port 33 while the flow path formed by the first constriction 53 comes to communicate with the output flow path groove 41 to thereby connect the second port 32 with the output port 33.

With reference to the first port 31 and the second port 32 of the pilot switching valve 1 according to the present embodiment, besides the above-described case of connecting the first port 31, serving as the input port, to the negative pressure source, and connecting the second port 32, as the de-vacuumizing port, to open air or the positive pressure source, there can be adopted various other forms such as, for example, a case of connecting both the ports 31, 32, as input ports to pressure sources, respectively, and a case of connecting one of the ports, as an input port, to a positive pressure source, and connecting the other port as an exhaust port to open air. Further, the number of the ports 31 to 33, and the number of valves for switching those ports are not limited to those described with reference to the present embodiment, but may be increased as necessary. Furthermore, the valve formed with the valve element 50 is not limited to the poppet valve, but may be a spool type valve.

[Effect of the Invention]

As described in detail hereinbefore, with the pilot switching valve apparatus, and the method of switching the pilot switching valve, according to the invention, only when the positive pilot pressure P1 and the negative pilot pressure −P2, are concurrently fed to the first pressure chamber, and the second pressure chamber, formed on the opposite sides of the valve spindle in the valve chest, respectively, displacement of the valve spindle, from the first pressure chamber side to the second pressure chamber side, takes place, thereby switching connection of the respective ports, so that even if the pilot pressure is unintentionally fed into either the first pressure chamber or the second pressure chamber by error, displacement of the valve spindle does not take place, thereby preventing switching of connection from occurring among the respective ports. Hence, malfunction of the switching valve can be prevented at a low cost without the need for a particular circuit.

What is claimed is:

1. A pilot switching valve apparatus comprising:
   a pilot switching valve comprising:
   a valve block having a plurality of ports, and a valve chest communicating with a first pilot flow path, and a second pilot flow path;
   a valve spindle having a valve element provided around the periphery thereof, for switching connection among the plurality of ports, inserted in the valve chest so as to be reciprocatively movable between two switching positions;
   a return spring for repulsing the valve spindle toward one of the switching positions by a urging force thereof, wherein
   a first pressure receiving face with an area S1 is provided at one end of the valve spindle, on the side of one of the switching positions, the first pressure receiving face together with an inner sidewall of the valve chest forming a first pressure chamber communicating with the first pilot flow path while a second pressure receiving face with an area S2 is provided at the other end of the valve spindle on the side of the other of the switching positions, the second pressure receiving face together with the inner sidewall of the valve chest forming a second pressure chamber communicating with the second pilot flow path;
   a positive pressure source connected to the first pilot flow path, for feeding a positive pilot pressure P1 into the first pressure chamber; and
   a negative pressure source connected to the second pilot flow path, for feeding a negative pilot pressure −P2 into the second pressure chamber,
   wherein
   a relationship exists such that $S1 \cdot P1 \leq F1$, $S2 \cdot P2 \leq F1$, and $S1 \cdot P1 + S2 \cdot P2 > F2$ provided that an urging force of the return spring is F1 when the valve spindle is at the one of the switching positions, and an urging force of the return spring is F2 when the valve spindle is at the other of the switching positions, so that only when the positive pilot pressure P1 and the negative pilot pressure −P2 are concurrently fed from the positive pressure source and the negative pressure source into the positive pressure chamber, and the negative pressure chamber, respectively, displacement of the valve spindle from the switching position on the side of the positive pressure chamber to the switching position on the side of the negative pressure chamber takes place, thereby effecting switching of connection among the plurality of ports.

2. A pilot switching valve apparatus according to claim 1, wherein a pair of valve seats are formed in the valve chest so as to oppose each other, the valve spindle is inserted in the valve chest such that the valve element is positioned between the pair of the valve seats, and the valve element is caused to come into contact, or out of contact with the respective valve seats by reciprocatively moving the valve spindle in the valve chest, thereby switching connection among the respective ports.

3. A pilot switching valve apparatus according to claim 1, wherein:
   the plurality of the ports comprises a first port, a second port, and an output port;
   the valve spindle has a pair of constrictions, for forming a flow path inside the valve chest, respectively, on opposite sides of the valve element thereof, and a pair of seal parts provided around the periphery thereof, so as to be slidable on the inner sidewall of the valve chest with the constrictions interposed therebetween, respective outer end faces of the pair of the seal parts together with respective end faces of the valve spindle form the first pressure receiving face and the second pressure receiving face, respectively, respective diameters of portions of the inner sidewall of the valve chest, where the respective seal parts of the valve spindle slide, are all substantially equal to respective diameters of portions of the inner sidewall of the valve chest, forming the respective valve seats;
   the first port and the second port communicate with respective parts of the valve chest, at positions where the flow path is formed by the pair of the constrictions, respectively, while the output port communicates with a part of the valve chest, positioned between the pair of the valve seats; and the valve element is brought into contact with, or out of contact with the respective valve seats by causing the valve spindle to move reciprocatively in the valve chest to thereby switch connection between the first port as well as the second port and the output port.

4. A method of switching a pilot switching valve comprising:

a valve block having a plurality of ports, and a valve chest communicating with a first pilot flow path, and a second pilot flow path;

a valve spindle having a valve element provided around the periphery thereof, for switching connection among the plurality of the ports, inserted in the valve chest so as to be reciprocatively movable between two switching positions; and a return spring for repulsing the valve spindle toward one of the switching positions by a urging force thereof, wherein a first pressure receiving face with an area S1 is provided at one end of the valve spindle, on the side of one of the switching positions, the first pressure receiving face together with an inner sidewall of the valve chest forming a first pressure chamber communicating with the first pilot flow path while a second pressure receiving face with an area S2 is provided at the other end of the valve spindle on the side of the other of the switching positions, the second pressure receiving face together with the inner sidewall of the valve chest forming a second pressure chamber communicating with the second pilot flow path, said method comprising the steps of;

concurrently feeding a positive pilot pressure P1 and a negative pilot pressure −P2, satisfying a relationship such that $$S1 \cdot P1 \leq F1,$$

$$S2 \cdot P2 \leq F1, \text{ and}$$

$$S1 \cdot P1 + S2 \cdot P2 > F2$$

provided that an urging force of the return spring is F1 when the valve spindle is at the one of the switching positions, and an urging force of the return spring is F2 when the valve spindle is at the other of the switching positions, into the positive pressure chamber, and the negative pressure chamber, via the first pilot flow path and the second pilot flow path, respectively; and causing displacement of the valve spindle from the switching position on the side of the positive pressure chamber to the switching position on the side of the negative pressure chamber to take place, thereby effecting switching of connection of the plurality of ports.

* * * * *